May 24, 1932.  L. DE MOSS  1,859,291
CASING MEASURING MACHINE
Filed Dec. 31, 1928
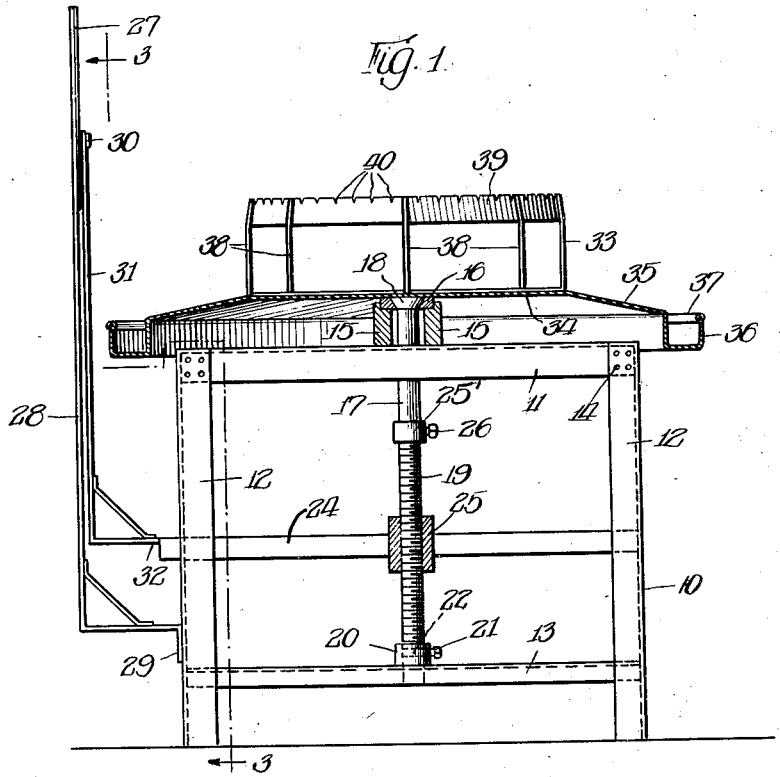
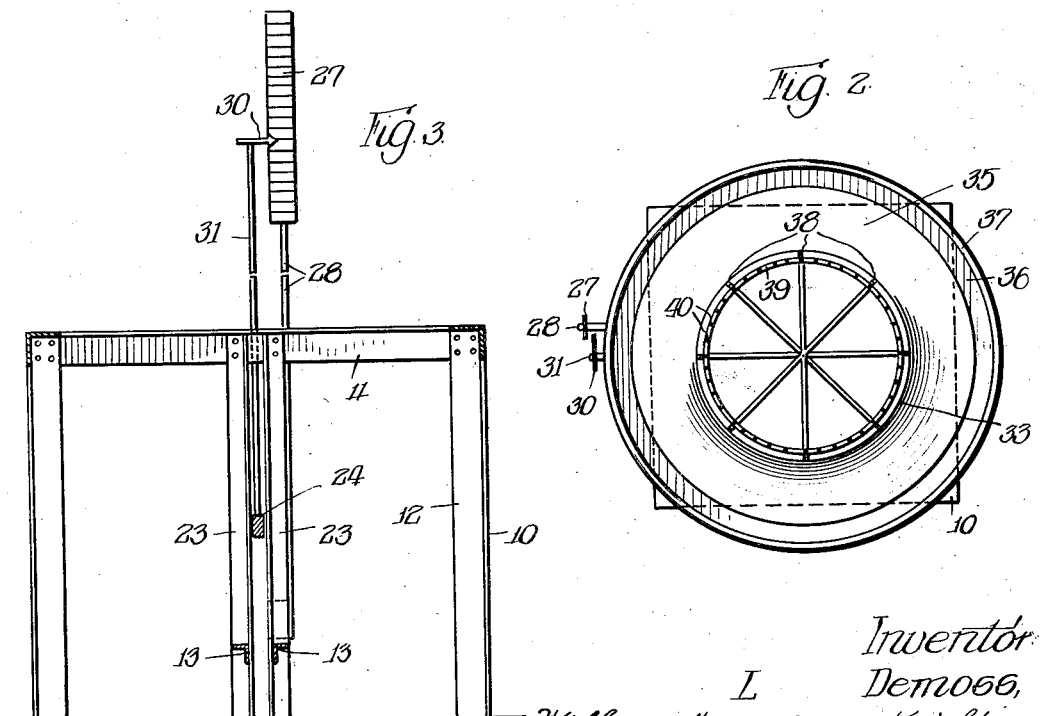
Inventor
L Demoss,
By Wilkinson, Huxley, Byron & Knight
attys.

Patented May 24, 1932

1,859,291

UNITED STATES PATENT OFFICE

LEONARD DE MOSS, OF DES MOINES, IOWA, ASSIGNOR TO SWIFT AND COMPANY, OF CHICAGO, ILLINOIS, A CORPORATION OF ILLINOIS

CASING MEASURING MACHINE

Application filed December 31, 1928. Serial No. 329,451.

This invention relates to measuring devices and particularly measuring devices of the type suitable for measuring lengths of long, flexible materials.

The invention is herein illustrated as embodied in a measuring reel constructed for measuring hog or like casings.

In the slaughtering industry, the intestines of the various animals, such as hogs, for instance, or casings as they are called, are recovered, prepared and sold. It is of course, the practice to ascertain the length of each piece recovered and in most instances to prepare hanks of the material of a particular grade by winding one or more pieces until an amount of predetermined length is obtained constituting the hank.

The measuring of the casings can be accomplished in various ways but the methods and means heretofore employed are slow, inaccurate and involve considerable hand labor and a maximum of skill.

By means of the present invention, the casings may be wound, as in the process of forming the hank with an accurate knowledge on the part of the operator of the exact amount (that is length) of casing on the reel at any instant, whereby the hank can be quickly and accurately formed. For instance, where a casing must be cut to provide the required length, the operator by means of the visible indicator or dial, is able to accurately select the location where the casing should be severed. The indicator also assists the operator in cases where the piece or pieces originally wound are not long enough to make up the complete hank, as he is able to readily determine the length required to complete the hank and thereby to select a piece for completing the hank, which is the correct or approximately the correct length, or in any event, select a piece which may be used with the greatest economy. This eliminates the liability of cutting long pieces to obtain a relatively short portion thereof or other expensive and wasteful steps which might be inadvertently practiced by the old method of preparing the hanks of casings.

By the use of the present device, the operator not only knows at all times, the exact length of casing on the winding reel but at a glance he may readily determine how many separate pieces of casing have been employed to make up the hank.

A great advantage which is realized by employing the present device is that of great accuracy which is found to result in thousands of dollars savings annually, where large volumes of casings are prepared and sold as is the case in large slaughtering and packing houses.

An object of the present invention is to provide a device having the above stated advantages and which is cheaply manufactured and maintained and is highly efficient in operation.

The invention is illustrated in one embodiment thereof which is herein given by way of example and the scope of the invention may be determined after an understanding of the present embodiment and the advantages of the embodiment, appreciating that the embodiment is illustrative only.

The particular embodiment of the invention will be better understood by referring to the accompanying drawings in which—

Figure 1 is a side elevational view partly in cross section of a device constructed in accordance with the present invention.

Figure 2 is a plan view, slightly reduced in size, of the device shown in Figure 1.

Figure 3 is a sectional view taken on the line 3—3 of Figure 1, looking in the direction of the arrows.

By referring to the drawings, it will be noted that the present embodiment of the invention comprises a table 10, having a top support 11 and legs 12 and a bottom cross brace 13. This table may be of any suitable construction but is herein shown as being squared and made of channels of galvanized iron secured as by means of rivets or bolts 14.

Across the top of the table are a pair of transverse supports 15, which serve as a bearing for the flanged element 16, secured to the shaft 17, by means of the enlargement 18. The shaft extends downwardly and is provided throughout its lower portion with threads 19, and is mounted in the bearing 20, by means of the screw 21 and groove 22.

This maintains the shaft against longitudinal movement but permits rotation thereof. At the front and back ends of the table 10, are a pair of vertical guides 23, of the construction shown in Figure 3, which serve as a vertical guideway for the traveling beam 24.

The beam is provided centrally with a screw threaded hub 25, threadingly mounted on the shaft so that rotation of the shaft will cause the traveling beam to move upwardly and downwardly, depending upon the direction of the rotation.

A collar 25', provided with a lock screw 26, is mounted on the shaft at the upper extremity of the threaded portion, which prevents the hub 25, from being raised too far in the upper direction. A graduated dial 27, is mounted by means of the bracket 28, to the table as at 29 in such position that it is readily visible to the operator of the machine.

A pointer 30, carried by the bracket arm 31, is secured as at 32, to the traveling beam 24, so that the vertical movement of the traveling beam is readily detectable by the relationship of the pointer to the graduated dial.

Mounted on the upper end of the shaft 17, above the table is the drum 33, which comprises a disc base portion 34, having its outer portion inclined downwardly as at 35 and terminating in the formation of a gutter, 36. The outer edge of the gutter may be rolled or finished in any desired manner as at 37.

Extending upwardly in spaced relation from the disc base member are a plurality of posts or pegs, 38 which are arranged on the circumference of a circle so as to form in effect, a winding surface, in the nature of a reel.

Connected to the upper ends of the pegs is a flexible band, 39 which may be constructed of rubber attached to the inner surfaces of the pegs. The band is provided with a plurality of notches or slits, 40, of such construction that they are readily serviceable as means for attaching the ends of casings so as to fasten the casings in winding relationship to the drum. It is desirable to have the pegs 38, of such material that they will have no detrimental effect upon the casings being wound thereon and for the purpose of this illustration, they may be of monel metal.

The surface 35, which is in the nature of a drain skirt serves to deflect any water or other liquid material which may run from the casings into the gutter 36, where it may be disposed of without interference with the operation. It is to be understood that the graduated dial has indicating marks thereon of such nature that the pointer will indicate revolutions of the drum, this of course being determined with relationship to the nature of the screw threads shown at 19.

From the above description, it will be appreciated that the drum which is of known diameter, may receive by one revolution, a predetermined amount, by length of casing wound thereon and that the exact amount on the drum at any one time will always be apparent on the dial by the position of the pointer. It will also appear that the casing ends as they are placed in the slits 40, will be readily visible at a glance and will serve to inform the operator as to the number of pieces on the drum at any one time.

In operation, the operator merely secures a casing end to the drum by inserting it in one of the receiving slits 40, at a time when the indicator is in a suitable starting position. The operator then turns the drum in a winding direction, directing his attention primarily to the position of the pointer which guides him as to the amount of material on the drum. If the initial piece is not sufficiently long to constitute a complete hank, the additional amount may be readily determined from the dial and a suitable piece or pieces selected, or, if the situation requires that a particular piece be cut to produce the exact length in a hank, the location of the pointer on the dial will direct him as to the exact point at which the casing should be severed.

It will be appreciated that the above described device provides all of the above mentioned advantages. It is obvious that various equivalents of the disclosed structure may be utilized without departing from the spirit of the invention, the scope of the invention being set forth in the appended claims.

What is claimed is—

1. A casing measuring reel, comprising a table, vertically aligned bearings carried by said table, a spindle carried in said bearings, a horizontally disposed reel mounted on said spindle and located above said table, a vertically movable arm having a screw threaded engagement with said spindle, a pointer, and means whereby said pointer is fixed to said arm and a graduated scale stationarily mounted on said table in indicating association with said pointer, said pointer and scale being vertically disposed above said table and visibly above said reel.

2. In a casing measuring device, a support, bearings in said support, a spindle in said bearings, a reel on said spindle, said reel comprising a casing receiving portion and a flexible marginal element having a plurality of circumferentially spaced casing securing notches therein, and indicating means operatively connected to said spindle for indicating rotations of said reel.

3. In a casing measuring device, the combination of a table having a vertically mounted spindle thereon, and a casing reel on said spindle horizontally disposed above said table, said reel comprising a casing receiving portion and a downwardly and outwardly extending drain skirt portion, and means operable by the rotations of said spindle for indicating the length of casing wound on said reel.

4. In a casing measuring device, the combination of a table having a vertically mounted spindle thereon, and a casing reel on said spindle, horizontally disposed above said table, said reel comprising a casing receiving portion and a downwardly and outwardly extending drain skirt portion and a drain gutter at the outside lower edge of said drain skirt portion, and means operable by the rotations of said spindle for indicating the length of casing wound on said reel.

5. A measuring device of the character described comprising in combination, a vertical spindle, a horizontally disposed winding reel mounted on said spindle, said winding reel comprising a disc base portion, a plurality of upstanding spaced posts on said base portion, said posts being located on the circumference of a circle, and a flexible, annular band extending around and fixed to the upper portions of said posts and indicating means connected to said spindle for movement with the rotation thereof for indicating the length of the casing wound on said reel.

6. A measuring device of the character described comprising in combination, a vertical spindle, a horizontally disposed winding reel mounted on said spindle, said winding reel comprising a disc base portion, a plurality of upstanding spaced posts on said base portion, said posts being located on the circumference of a circle, and a flexible, annular band extending around and fixed to the upper portions of said posts, said band having a plurality of spaced casing gripping slits therein and indicating means connected to said spindle for movement with the rotation thereof for indicating the length of the casing wound on said reel.

Signed at Des Moines, this 24th day of December, 1928.

LEONARD DE MOSS.